United States Patent [19]

Motomiya

[11] Patent Number: 4,688,180

[45] Date of Patent: Aug. 18, 1987

[54] PATTERN-SWITCHING TEMPERATURE CONTROL APPARATUS

[75] Inventor: Takehiko Motomiya, Tokyo, Japan

[73] Assignee: Ohkura Electric Co., Ltd., Tokyo, Japan

[21] Appl. No.: 806,817

[22] Filed: Dec. 10, 1985

[30] Foreign Application Priority Data

Dec. 19, 1984 [JP] Japan ................................ 59-266411

[51] Int. Cl.⁴ .......................... G06F 15/46; F27D 3/00
[52] U.S. Cl. .................................... 364/477; 364/557; 432/11; 432/51
[58] Field of Search ............... 364/469, 472, 477, 506, 364/557, 400; 432/11, 12, 18, 36, 37, 45, 49, 51, 54; 266/78, 80, 87, 90, 96, 99

[56] References Cited

U.S. PATENT DOCUMENTS

| | | | |
|---|---|---|---|
| 4,004,138 | 1/1977 | Morooka et al. | 364/477 X |
| 4,223,385 | 9/1980 | Miller et al. | 364/477 X |
| 4,373,364 | 2/1983 | Tanimoto et al. | 364/477 X |
| 4,394,121 | 7/1983 | Wakamiya et al. | 432/11 |
| 4,501,552 | 2/1985 | Wakamiya | 364/477 X |
| 4,577,278 | 3/1986 | Shannon | 364/477 |

*Primary Examiner*—Joseph Ruggiero
*Attorney, Agent, or Firm*—Oblon, Fisher, Spivak, McClelland, & Maier

[57] ABSTRACT

An apparatus controls the temperature of a multi-zone furnace based on a given temperature distribution pattern, which pattern is automatically switched zone by zone while considering inter-zone thermal interferences as the work being heat-treated is changed by using a memory storing a series of such patterns for different kinds of works.

12 Claims, 11 Drawing Figures

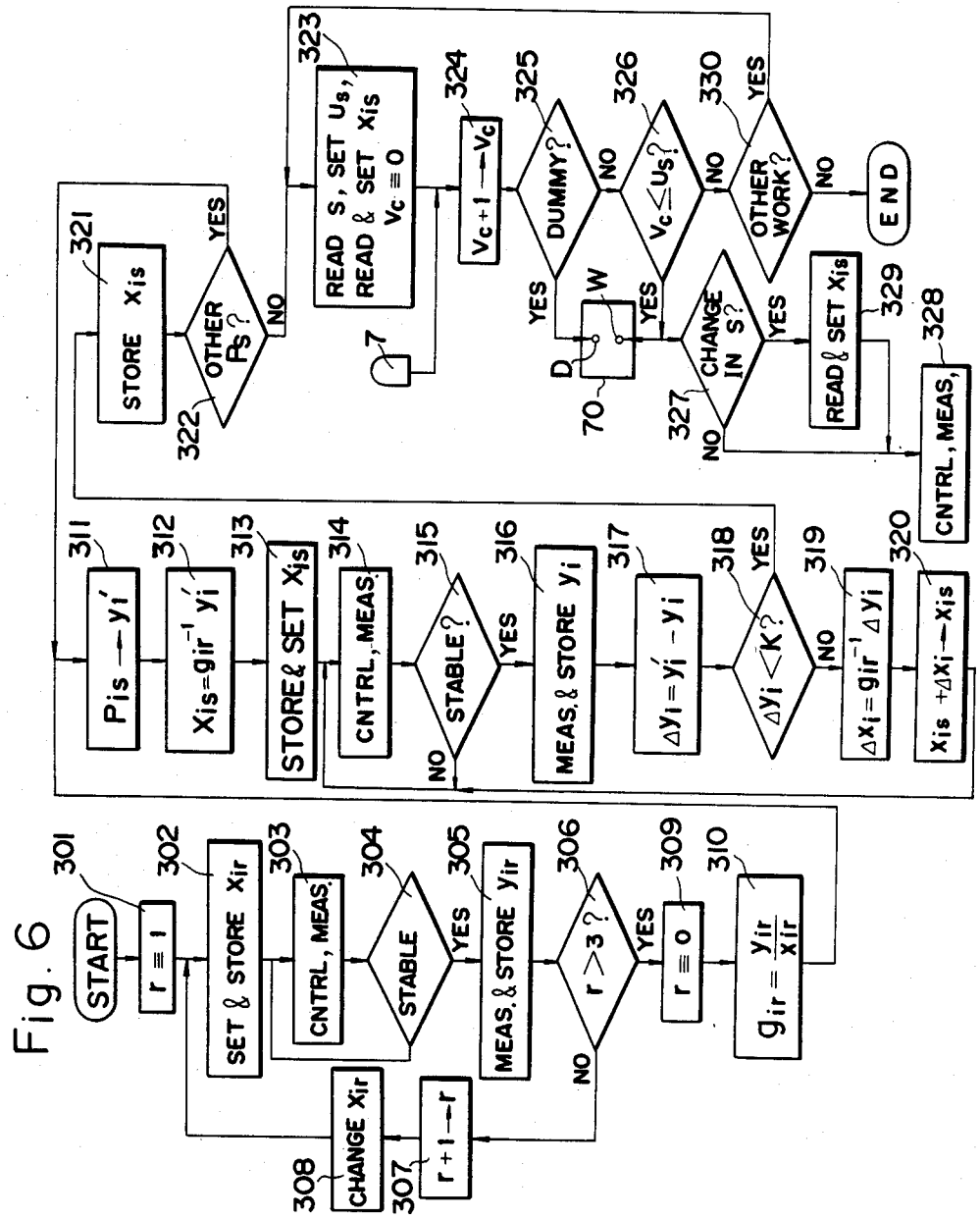

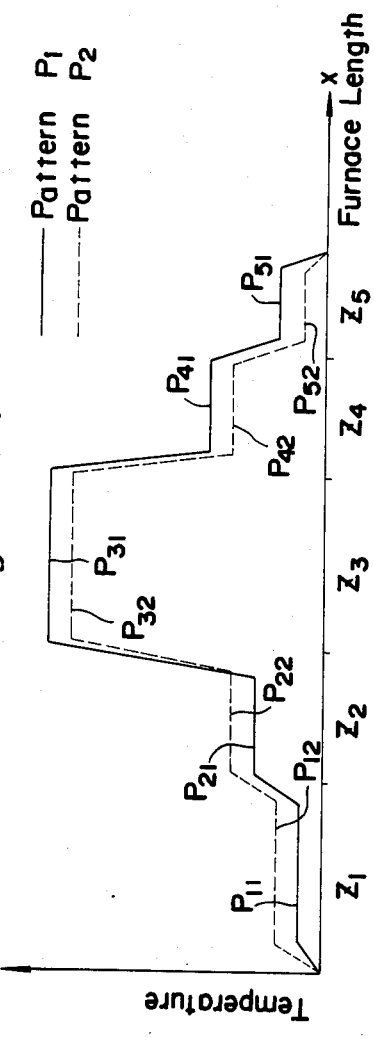
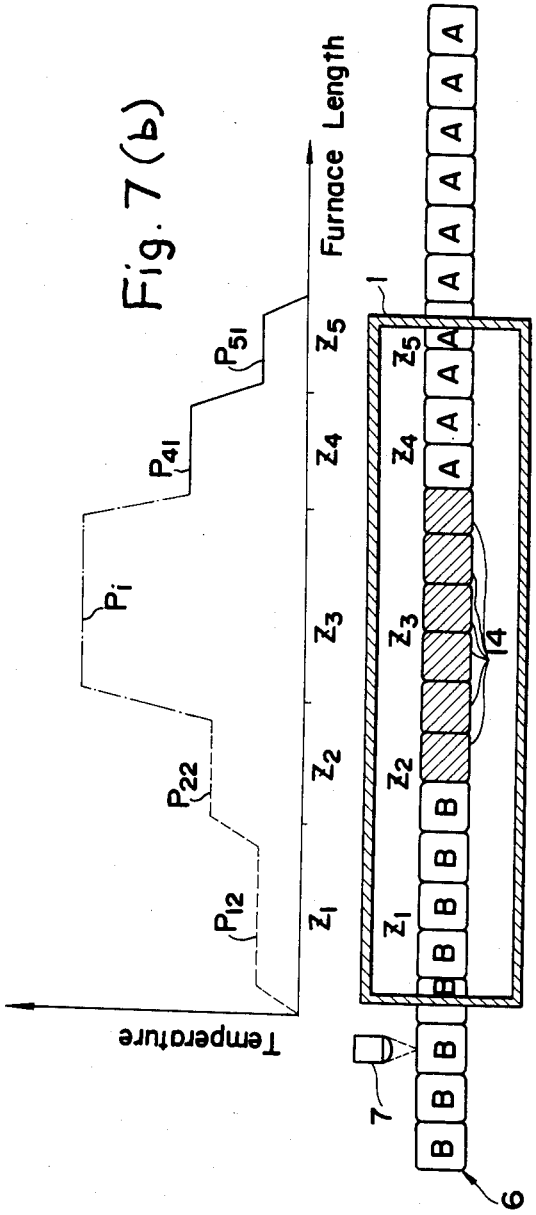

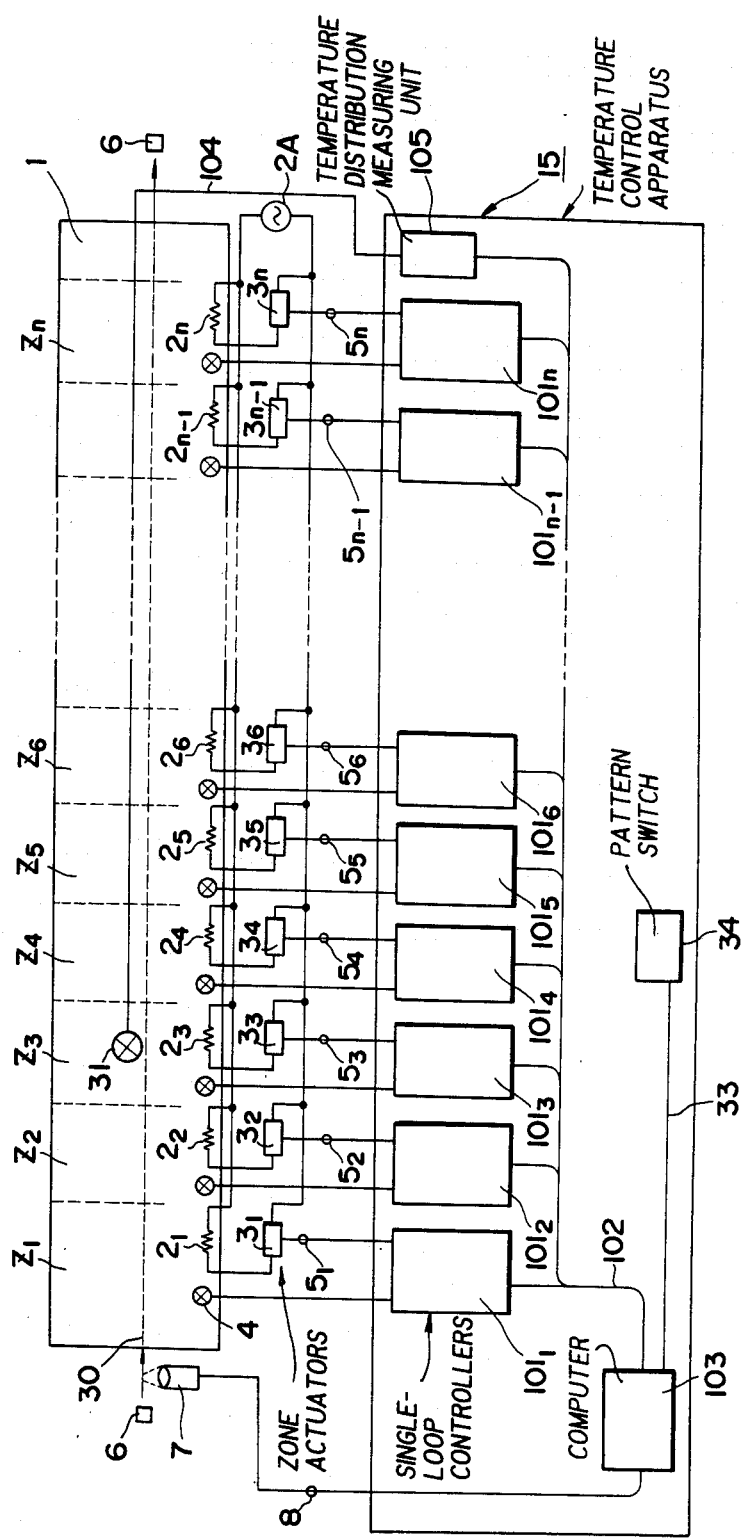

PATTERN-SWITCHING TEMPERATURE CONTROL APPARATUS

BACKGROUND OF THE INVENTION

1. Field of the Invention

This invention relates to a temperature control apparatus for a furnace having a plurality of mutually interfering zones therein (to be referred to as the "multi-zone furnace", hereinafter) for heat-treating works at different temperatures, which apparatus automatically switches temperature distribution pattern in the furnace and deals with the inter-zone thermal interference. More particularly, the invention relates to a temperature control apparatus for controlling the temperature distribution in the so-called tunnel furnace while dealing with inter-zone interference therein. Such tunnel furnace maintains a specific pattern of temperature distribution in the longitudinal direction thereof so as to heat-treat works while they are moved therethrough by a conveyor or the like, using the temperature control apparatus to automaticalluy switch the pattern of temperature distribution in the furnace when the kind of works being heat-treated is changed.

2. Description of the Prior Art:

In tunnel type furnaces, such as conveyor furnaces and pusher furnaces, a proper temperature distribution pattern is established therein at first and then works are conveyed therethrough at a suitable speed so as to carry out the desired heat treatment.

FIG. 2 schematically shows a conventional tunnel furnace. The furnace 1 has a plurality of zones $Z_1$, $Z_2$, . . ., $Z_n$, and each zone is heated by a heating element 2 such as an electric heater. The heating of the furnace is controlled zone by zone either continuously or intermittently by actuating means 3 such as thyristors or other suitable electromagnetic switches. Heating-portion thermometers 4, such as thermocouples, are disposed in the individual zones so as to detect the actual zone temperatures and communicate the detected temperatures to controllers 28A, 28B, . . . , 28N which are associated with the furnace zones respectively. Each controller has an arithmetic-logic unit 27A which compares the thus communicated actual zone temperature against the set value on a temperature setting element 27 thereof, and the unit 27A generates a control signal 5 based on the result of the comparison.

Each control signal 5 is applied to the actuating means 3 of the associated furnace zone, so as to regulate the energy supply to the heating element 2 of the furnace zone from an energy source 2A until the control signal 5 is reduced to nil, i.e., until the actual zone temperature is brought to the set value of the zone temperature. In cases when the actuating means 3 are thyristors or other electromagnetic switches and the power source 2A is an electric power source, the control signals 5 regulate the making and breaking of the electric circuits through the actuating means 3.

The above temperature control brings about an overall temperature distribution pattern in the furnace 1, such as that of the solid line curve Pa or the dashed-line curve Pb of FIG. 2. Works 6 are heat-treated as they are moved through the furnace 1, as shown by the arrow 30, while the desired temperature distribution pattern is maintained therein.

To check whether the desired temperature distribution pattern is built up by the heating elements 2 in the furnace 1 or not, the example of FIG. 2 uses an intra-furnace thermometer 31 of movable type. The intra-furnace thermometer 31 moves in the furnace 1, so as to detect and communicate the temperature within the furnace 1 to a recorder 32. Whereby, the recorder 32 stores and displays the intra-furnace temperature.

In the conventional arrangement of FIG. 2, when the values and distribution of the temperature recorded are different from what is desired, set values on the setting elements 27 of the related controllers 28A-28N are manually changed, and after the temperature in the furnace is stabilized, the temperature distribution in the furnace 1 is measured again. Since adjacent ones of the sub-divided zones $Z_1$-$Z_n$ of the furnace 1 are not completely independent and the furnace 1 has to provide for the passage of the works 6 to be heat-treated, the temperature at controllable portions or heating portions of the furnace is inevitably different from that at the inside or work passage thereof. Accordingly, even when the temperature setting of any particular zone is independently modified to a desired level, the inside temperature of that zone is affected by the adjacent zones on both sides thereof, and the desired inside temperature is not necessarily produced by such a modification of the setting.

In the actual change of the temperature distribution in a furnace by modifying the setting of each heating element 2, it has been a practice to change the setting at first and wait until the inside temperature of the furnace is stabilized, to measure the temperature distribution pattern in the furnace by moving the intra-furnace thermometer 31, and to readjust the setting depending on the difference between the desired temperature in the furnace and the thus measured temperature. The above measurement and the readjustment are repeated until the desired temperature distribution pattern is produced in the furnace.

Accordingly, the conventional temperature control apparatus has a shortcoming in that considerable time and labor are necessary to produce the desired temperature distribution pattern in the furnace 1. The recent trend of industrial manufacturing is to produce a large variety of good in small quantities, and the temperature distribution pattern necessary to meet such trend is diversified. Thus, the above time-consuming and laborious process of the setting readjustment is frequently required.

Further, it requires not only a complicated procedure but also considerable experience and skill to find out and set suitable settings on the controllers 28A-28N for producing the desirable temperature distribution pattern for a specific kind of work 6 and to readjust the setting repeatedly in the above-mentioned manner each time the kind of work is changed.

SUMMARY OF THE INVENTION

Therefore, an object of the present invention is to overcome the above shortcomings of the prior art by providing an improved temperature control apparatus for a multi-zone furnace. The temperature control apparatus of the invention is particularly suitable for controlling the temperature in a multi-zone furnace having an intra-furnace thermometer means to measure the inside temperature of the furnace, with each of its zones having a heating portion which carries both a heating element and a heating-portion thermometer.

One of the features of the temperature control apparatus of the invention is that it deals with thermal interference between adjacent zones of the tunnel-type furnace at the time of switching the furnace temperature, that it automates the switching of the intra-furnace temperature distribution pattern, that it effects the switching of the temperature distribution in synchronism with the work movement in the furnace, and that it speeds up the switching of the temperature distribution pattern.

To fulfill the above object and features, a pattern-switching temperature control apparatus dealing with inter-zone interference according to the present invention uses functional members including a work setting element, a temperature setting element, a memory, a calculating means to determine heat transfer gains, a counting means, a setting means, and a regulating means.

The work setting element is an element on which a number, representing a prescribed quantity of each kind of works to be heat-treated, is set. The temperature setting element is an element on which a series of temperature settings ($x_i$) for individual heating portions of the furnace zones ($Z_i$) are set.

The memory in the temperature control apparatus of the invention is adapted to store a plurality of temperature distribution patterns ($P_{is}$) for the furnace, a set of the above-mentioned numbers representing the prescribed quantities of the different kinds of works to be heat-treated at the corresponding temperature distribution patterns, a set of different series of temperature settings ($x_{ir}$) to be selectively set on the temperature setting element, and a set of inside temperatures ($y_{ir}$) detected by the intra-furnace thermometer means at different furnace zones when the temperature setting element carries corresponding ones of the settings ($x_{ir}$).

The calculating means calculates a heat transfer gains ($g_{ir}$) from the above-mentioned set of temperature settings ($x_{ir}$) and the set of inside temperatures ($y_{ir}$), calculates a series of temperature settings ($x_{is}$) for the temperature distribution patterns ($P_{is}$) by using the heat transfer gains ($g_{ir}$), and stores the thus calculated series of temperature settings in the memory. The heat transfer gains will be described in detail hereinafter. The counting means counts the number of those works of one kind which are heat-treated by the furnace.

The setting means is adapted, when the count of the counting means coincides with the prescribed quantity of a certain kind of works, to read out that number from the memory onto the work setting means which represents the prescribed quantity of the works to be heat-treated next and to read out the above calculated series of temperature settings for the temperature distribution pattern to be used next from the memory.

The regulating means of the temperature control apparatus is adapted to control the heating element depending on the difference between the actual temperature detected by the heating-portion thermometer and temperature settings on the temperature setting element.

BRIEF DESCRIPTION OF THE DRAWINGS

FIG. 6 is a flow chart of the operation of the temperature control apparatus of the invention;

FIGS. 7a and 7b show curves and a diagram which are used in the description of the invention;

FIG. 10 is a block diagram of another embodiment of the invention which uses a computer;

Like parts are designated by like numerals and symbols throughout different views of the drawings.

DESCRIPTION OF THE PREFERRED EMBODIMENT

Figure 1:
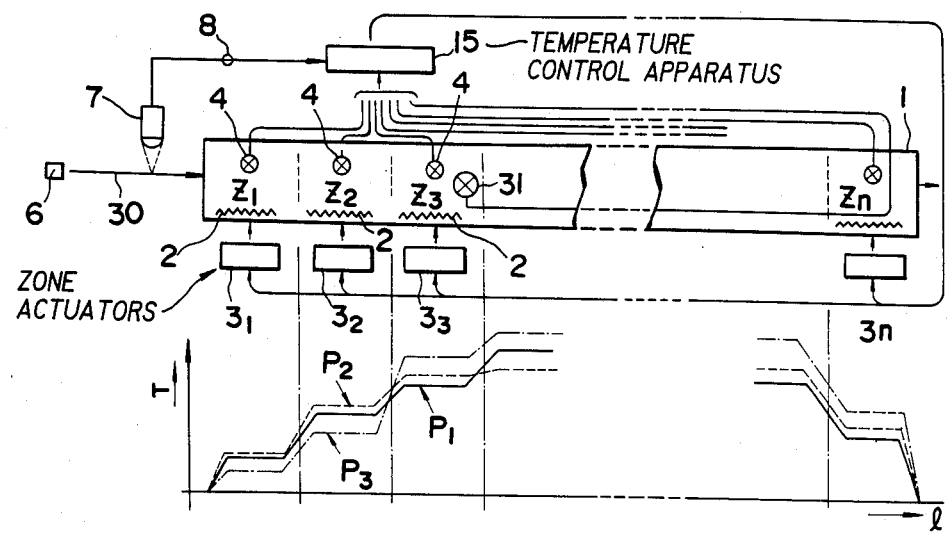
FIG. 1 is a diagrammatic illustration of a pattern-switching temperature control apparatus according to the invention, which apparatus suits to control the temperature of a tunnel furnace.
Figure 8:
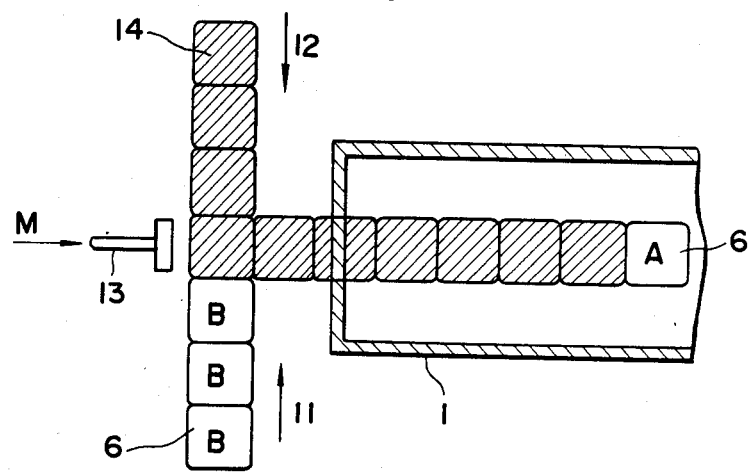
FIG. 8 is an explanatory diagram of a work line and a dummy line.

The operative principles of the temperature control apparatus of the invention will be described now. FIG. 1 shows a schematic block diagram of an embodiment of the invention and temperature distribution pattern curves. A furnace 1 has a plurality of zones $Z_1, Z_2, \ldots, Z_n$, each zone having a heating element 2 which is controlled by a pattern-switching temperature control apparatus 15 of digital type through the corresponding one of actuating means $3_1, 3_2, \ldots, 3_n$. In the illustrated example, a movable intra-furnace thermometer 31 moves through the furnace 1, so as to measure the temperature distribution pattern in the furnace 1. The intra-furnace thermometer 31 need not be movable as will be explained later. FIG. 1 also shows three different patterns $P_1$, $P_2$ and $P_3$ of temperature distribution in the furnace 1 for treating works 6 of different kinds.

In the temperature control apparatus 15 of the invention, settings at the temperature setting element 40 (FIG. 5) represent set values for the temperatures at the heating portions, or portions in the vicinity of the heating elements 2, of the individual zones $Z_1$-$Z_n$. To produce a desired temperature distribution pattern in the furnace 1, the temperature setting element 40 is first set at such settings which appear to produce intra-furnace temperatures (to be referred to as the "inside temperatures", hereinafter) which satisfy the desired temperature distribution pattern. Then the temperature control apparatus 15 is put into operation. After the inside temperatures of the zones $Z_1$-$Z_n$ are stabilized, the intra-furnace thermometer 31 moves from the entry side end, zone $Z_1$, to the exit side end, zone $Z_n$, so as to successively measure the inside temperatures of the individual zones. The inside temperature of each zone thus measured is stored in a memory 20.

In general, the temperature at the heating portion near the heating element 2 being controlled from the outside of the furnace 1 is different from the inside temperature, because the works 6 move through the inside of the furnace 1 as shown by the arrow 30 of FIG. 1. For clarity, the temperature of the heating portion in the vicinity of the heating element 2 being controlled from the outside of the furnace 1 will be referred to as the "outside temperature" x, while the temperature within the furnace along the passage of the works 6 will be referred to as the "inside temperature" y as defined above. For simplicity, it is assumed that, after the furnace temperature is stabilized by proper control actions, the outside temperature x coincides with the setting on the temperature setting element 40 of the temperature control apparatus 15.

If the heat transfer gain from the outside temperature $x_i$ to the inside temperature $y_i$ in the furnace zone $Z_i$ is represented by $g_{ii}$, and if the transfer gain from the outside temperature $x_j$ of the zone $Z_j$ to the inside temperature $y_i$ of the zone $Z_i$ is represented by $g_{ij}$, the relationship between the outside temperature x and the inside temperature y is given by the following equation.

$$\left.\begin{aligned}
y_1 &= g_{11}x_1 + g_{12}x_2 + g_{13}x_3 + \ldots + g_{1n}x_n \\
y_2 &= g_{21}x_1 + g_{22}x_2 + g_{23}x_3 + \ldots + g_{2n}x_n \\
&\vdots \\
y_n &= g_{n1}x_1 + g_{n2}x_2 + g_{n3}x_3 + \ldots + g_{nn}x_n
\end{aligned}\right\} \quad (1)$$

The equation (1) can be expressed in the form of the following matrix equation.

$$\begin{bmatrix} y_1 \\ y_2 \\ \vdots \\ y_n \end{bmatrix} = \begin{bmatrix} g_{11} & g_{12} & g_{13} & \cdots & g_{1n} \\ g_{21} & g_{22} & g_{23} & \cdots & g_{2n} \\ \vdots & & & & \vdots \\ g_{n1} & g_{n2} & g_{n3} & \cdots & g_{nn} \end{bmatrix} \begin{bmatrix} x_1 \\ x_2 \\ \vdots \\ x_n \end{bmatrix} \quad (2)$$

Here, the inside temperatures $y_1, y_2, \ldots, y_n$ are measured by the intra-furnace thermometer 31, while the outside temperatures $x_1, x_2, \ldots, x_n$ are either known as the settings of the temperature setting elements 40 or measured by the heating-portion thermometers 4.

In the equation (2), there are $n^2$ transfer gains g, and to determine all of them, n times of measurements are necessary. In each time of such measurement, the outside temperatures x must be different from those of the other measurements, because repeated measurements with identical outside temperatures x merely produce identical equalities and do not produce any meaningful equations. The measured values of such n times of measurements satisfy the following relationship, provided that $y_{ir}$ represents the inside temperature of ith zone $Z_i$ as determined by the rth measurement, and $x_{ir}$ represents the outside temperature of the ith zone $Z_i$ as set or measured in the rth measurement.

$$\begin{bmatrix} y_{11} & y_{12} & y_{13} & \cdots & y_{1n} \\ y_{21} & y_{22} & y_{23} & & y_{2n} \\ \vdots & & & & \vdots \\ y_{n1} & y_{n2} & y_{n3} & \cdots & y_{nn} \end{bmatrix} = \quad (3)$$

$$\begin{bmatrix} g_{11} & g_{12} & g_{13} & \cdots & g_{1n} \\ g_{21} & g_{22} & g_{23} & & g_{2n} \\ \vdots & & & & \vdots \\ g_{n1} & g_{n2} & g_{n3} & \cdots & g_{nn} \end{bmatrix} \begin{bmatrix} x_{11} & x_{12} & x_{13} & \cdots & x_{1n} \\ x_{21} & x_{22} & x_{23} & & x_{2n} \\ \vdots & & & & \vdots \\ x_{n1} & x_{n2} & x_{n3} & \cdots & x_{nn} \end{bmatrix}$$

If the equation (3) is solved with respect to the matrix of g, all the transfer gains g both between the inside and outside temperatures in each zone and between adjacent zones can be determined. Once the entire transfer gains g are obtained, the outside temperature distribution $[x_1' \ x_2' \ \ldots \ x_n']'$ (The primed matrix stands for a transposed matrix,) for producing any inside temperature distribution $[y_1' \ y_2' \ \ldots \ y_n']'$ can be determined through calculation by using the equation (3).

The invention is to produce a desired inside temperature distribution pattern in the furnace by setting the above-mentioned outside temperature distribution $[x_1' \ x_2' \ \ldots \ x_n']'$ as determined through the measurement and the calculation. When the number of the zones in a furnace 1 is small, the equation (3) can be applied directly. However, in the actual industrial production lines, a tunnel furnace with ten or more zones is not rare, and as the number of zones increases, the direct application of the equation (3) results in an increased number of measurements and the calculation becomes very complicated.

Figure 3:
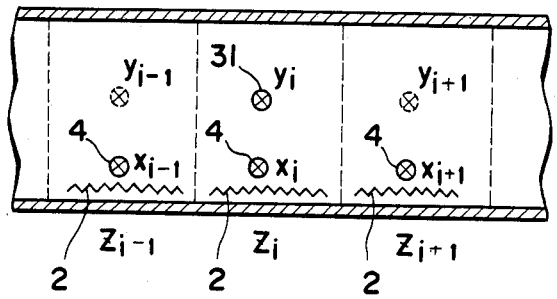
FIG. 3 is a schematic diagram showing the relationship among adjacent zones of a tunnel furnace.
Figure 4:
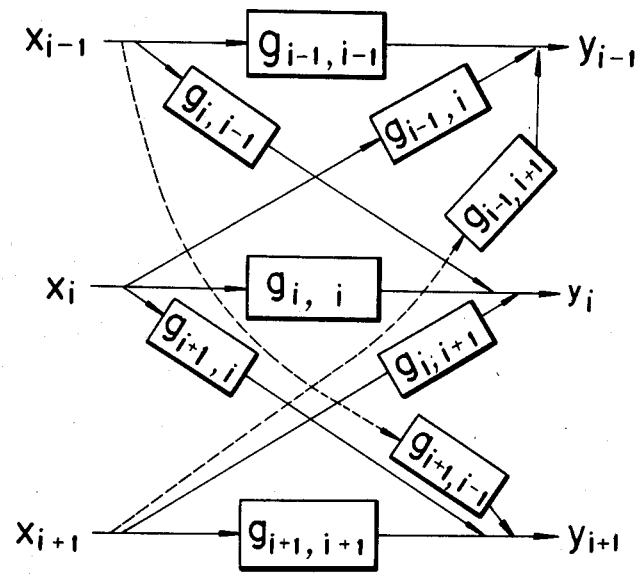
FIG. 4 is a diagrammatic illustration of heat transfer gains between the heating-portion temperature and the inside temperature of a furnace.

For practical purposes, the following simplified method may be used. FIG. 3 shows the disposition of the ith zone $Z_i$ with adjacent zones $Z_{i-1}$ and $Z_{i+1}$, and FIG. 4 illustrates self transfer gains $g_{ii}$ and mutual transfer gains $g_{ij}$. It can be safely assumed that the mutual transfer gains between contiguous zones, such as $g_{i,i+1}$, are significant while the mutual transfer gains between non-contiguous zones, such as $g_{i-1,i+1}$ are negligible and not significant. Thus, the mutual transfer gain between any two zones which are so separated that one or more zones lie therebetween, such as that between the zone $Z_{i-1}$ and the zone $Z_{i+1}$ of FIG. 3, can be safely assumed to be negligible.

Under such an assumption, the above equations (1) and (2) can be simplified as follows.

$$\left.\begin{aligned}
y_1 &= g_{11}x_1 + g_{12}x_2 \\
y_2 &= g_{21}x_1 + g_{22}x_2 + g_{23}x_3 \\
y_3 &= \phantom{g_{21}x_1 + } g_{32}x_2 + g_{33}x_3 + g_{34}x_4 \\
&\vdots \\
y_n &= \phantom{xxxxxxxxxxxx} g_{n,n-1}x_{n-1} + g_{nn}x_n
\end{aligned}\right\} \quad (4)$$

Rearrangement of the equations (4) in a matrix form gives the following.

$$\begin{bmatrix} y_1 \\ y_2 \\ y_3 \\ \vdots \\ y_n \end{bmatrix} = \begin{bmatrix} g_{11} & g_{12} & 0 & \cdots & & 0 \\ g_{21} & g_{22} & g_{23} & 0 & \cdots & 0 \\ 0 & g_{32} & g_{33} & g_{34} & 0 & \cdots & 0 \\ \vdots & & & & & & \vdots \\ 0 & \cdots & & 0 & g_{n,n-1} & g_{nn} \end{bmatrix} \begin{bmatrix} x_1 \\ x_2 \\ x_3 \\ \vdots \\ x_n \end{bmatrix} \quad (5)$$

The number of transfer gains to be determined in the equation (5) is $(3n-2)$ in total, because the opposite end zones do not have any contiguous zones toward the outside of the furnace. Thus, it is sufficient to move the intra-furnace thermometer 31 three times through the furnace 1 for determining the transfer gains under the above assumption, so that the measurements and the calculations are greatly simplified. The distribution of the inside temperature y, which is determined by the three measurements of the intra-furnace thermometer, satisfies the following equation.

$$\begin{bmatrix} y_{11} & y_{12} & y_{13} \\ y_{21} & y_{22} & y_{23} \\ y_{31} & y_{32} & y_{33} \\ \cdot \\ \cdot \\ y_{n1} & y_{n2} & y_{n3} \end{bmatrix} = \begin{bmatrix} g_{11} & g_{12} & 0 & . & \ldots & 0 \\ g_{21} & g_{22} & g_{23} & 0 & \ldots & 0 \\ 0 & g_{32} & g_{33} & g_{34} & 0 & \ldots & 0 \\ \cdot & \cdot & \cdot \\ 0 & 0 & 0 & \ldots & 0 & g_{n,n-1} & g_{nn} \end{bmatrix} \begin{bmatrix} x_{11} & x_{12} & x_{13} \\ x_{21} & x_{22} & x_{23} \\ x_{31} & x_{32} & x_{33} \\ \cdot \\ x_{n1} & x_{n2} & x_{n3} \end{bmatrix} \quad (6)$$

The inside temperature $y_i$ of the ith zone $Z_i$ for the three measurements can be extracted from the above equation (6) and can be rearranged as follows.

$$\begin{bmatrix} y_{i1} \\ y_{i2} \\ y_{i3} \end{bmatrix} = \begin{bmatrix} x_{i-1,1} & x_{i1} & x_{i-1,1} \\ x_{i-1,2} & x_{i2} & x_{i-1,2} \\ x_{i-1,3} & x_{i3} & x_{i-1,3} \end{bmatrix} \begin{bmatrix} g_{i,i-1} \\ g_{i,i} \\ g_{i,i+1} \end{bmatrix} \quad (7)$$

Simplifying the equation (7) by representing the outside temperature determinant by a symbol A, i.e., $$A \equiv \begin{vmatrix} x_{i-1,1} & x_{i1} & x_{i+1,1} \\ x_{i-1,2} & x_{i2} & x_{i+1,2} \\ x_{i-1,3} & x_{i3} & x_{i+1,3} \end{vmatrix}$$

the transfer gains relating to the ith zone $Z_i$ are given by the following equations.

$$g_{i,i-1} = (1/A) \begin{vmatrix} y_{i1} & x_{i1} & x_{i+1,1} \\ y_{i2} & x_{i2} & x_{i+1,2} \\ y_{i3} & x_{i3} & x_{i+1,3} \end{vmatrix} \quad (8)$$

$$g_{i,i} = (1/A) \begin{vmatrix} x_{i-1,1} & y_{i1} & x_{i+1,1} \\ x_{i-1,2} & y_{i2} & x_{i+1,2} \\ x_{i-1,3} & y_{i3} & x_{i+1,3} \end{vmatrix} \quad (9)$$

$$g_{i,i+1} = (1/A) \begin{vmatrix} x_{i-1,1} & x_{i1} & y_{i1} \\ x_{i-1,2} & x_{i2} & y_{i2} \\ x_{i-1,3} & x_{i3} & y_{i3} \end{vmatrix} \quad (10)$$

Under the assumption of the equation (6), all of transfer gains can be determined by repeating the calculations of the equations (8), (9) and (10) for all zones $Z_1$ through $Z_n$ of the furnace 1. Thus, even when the furnace 1 has a large number of zones, the simplified method using the equations (6) through (10) allows the determination of all the transfer gains by repeating the setting of the outside temperatures at different levels followed by the measurement of the inside temperature through movement of the intra-furnance thermometer 31 three times.

The transfer gains g thus determined are stored in the memory 20 of the temperature control apparatus 15. The outside temperature distribution $[x_1' \ x_2' \ \ldots \ x_n']'$ necessary for producing the desired inside temperature distribution matrix $[y_1' \ y_2' \ \ldots \ y_n']$ must fulfill the conditions of the following equation concerning the transfer gain g.

$$\begin{bmatrix} y_1' \\ y_2' \\ y_3' \\ \cdot \\ \cdot \\ y_n' \end{bmatrix} = \begin{bmatrix} g_{11} & g_{12} & 0 & . & \ldots & 0 \\ g_{21} & g_{22} & g_{23} & 0 & \ldots & 0 \\ 0 & g_{32} & g_{33} & g_{34} & 0 & \ldots & 0 \\ \cdot & \cdot & \cdot \\ 0 & 0 & 0 & \ldots & 0 & g_{n,n-1} & g_{nn} \end{bmatrix} \begin{bmatrix} x_1' \\ x_2' \\ x_3' \\ \cdot \\ \cdot \\ x_n' \end{bmatrix} \quad (11)$$

Since the equation (11) is of step-form, the outside temperature distribution $[X_1' \ X_2' \ \ldots \ X_n']'$ necessary for producing the desired temperature distribution pattern, namely the above inside temperature derived step by step by elimination.

Accordingly, the pattern-switching temperature control of the multi-zone furnace considering the inter-zone interference can be achieved by regulating the heating-portion temperature or the outside temperature by using the equation (6) or equations (8) through (11).

The switching of the temperature distribution pattern may be synchronized with the change of the kind of the works moving in the furnace 1 by a suitable means. For instance, a number $U_s$ representing the quantity of the works 6 (to be referred to as the "prescribed quantity", hereinafter) to be heat-treated at a specific temperature distribution pattern is set on a work setting element 41 (FIG. 5), and a counting means 45 (FIG. 5) is provided so as to count the number of the works 6 fed into the furnace 1. When the count of the counting means 45 coincides with the prescribed quantity $U_s$, the temperature distribution pattern may be switched in synchronism therewith.

Figure 5:
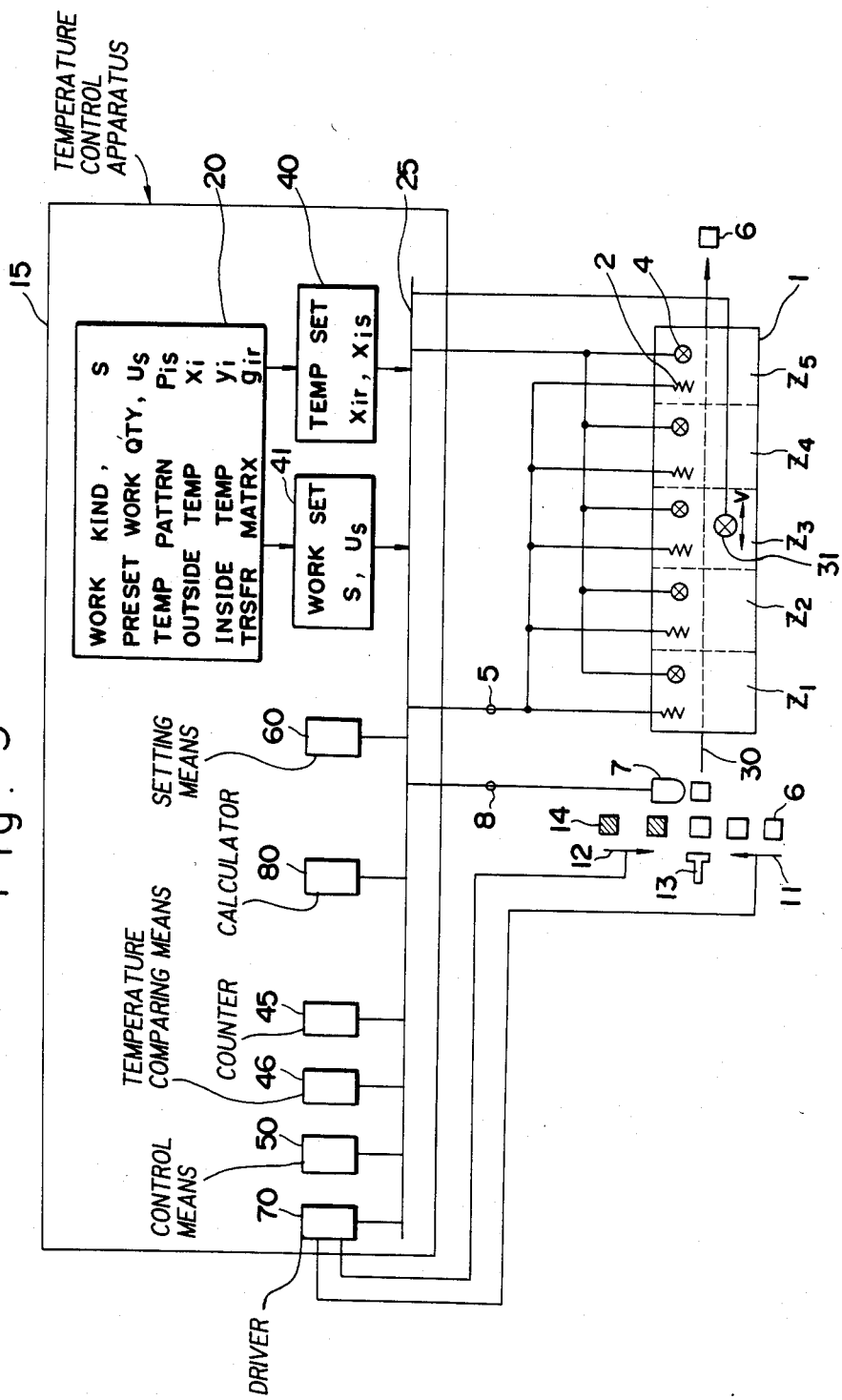
FIG. 5 is a block diagram of various functional means which constitute the temperature control apparatus of the invention.

The essential formation of the invention will be explained now. Referring to FIG. 5, a temperature control apparatus 15 according to the invention controls the temperature in a furnace 1 having a plurality of zones $Z_1$ through $Z_n$ and an intra-furnace thermometer 31 capable of detecting the inside temperature of each zone. Each zone of the furnace 1 has a heating-portion thermometer 4. To deal with the inter-zone interference and to facilitate the automatic switching of temperature distribution patterns, the temperature control apparatus 15 of the invention has a temperature setting element 40 on which either a series of the outside temperature settings $x_{is}$ for a specific temperature distribution pattern $P_s$ or a series of the above temperature settings $x_{it}$ of different values for determining the transfer gains are selectively set on a zone-by-zone basis. The apparatus 15 also has a work setting element 41 on which the above-mentioned prescribed quantity $U_s$ of the works 6 is set.

A memory 20 of the temperature control apparatus 15 of the invention stores the prescribed quantities $U_s$ of different kinds of works 6, the temperature distribution patterns $P_s$, series of the above outside temperatures settings $x_{it}$ of different values for determining the transfer gains, and inside temperatures $y_{it}$ of different zones as detected by the intra-furnace thermometer 31. A calculating means 80 determines the heat transfer gains $g_{it}$ from the above series of outside temperature settings $x_{it}$ of different values and the inside temperatures $y_{it}$ of the individual zones for the corresponding outside temperature settings by using the equations (3) or (6).

Once the heat transfer gains are determined, the calculating means 80 computes those outside temperature settings $x_{is}$, which produce the desired temperature distribution pattern $P_{is}$, by using, for instance, the equation (11). The calculating means 80 stores the thus determined outside temperature settings $x_{is}$ in the memory 20.

The calculated outside temperature settings $x_{is}$ thus stored in the memory 20 are selectively read out onto the above-mentioned temperature setting element 40 by a setting means 60 in response to the operation of the furnace 1. The setting means 60 also acts to read out the prescribed quantity $U_s$ of the work 6 from the memory 20 onto the work setting element 41. The work kind S is related to the above-mentioned prescribed quantity $U_s$, so that the apparatus of the invention can identify the work kind S by the prescribed quantity $U_s$. However, if necessary, it is possible to assign separate "work kind signals S" and set such signals S on the work setting element 41.

For example, in the case of a furnace 1 having five zones $Z_1$, $Z_2$, $Z_3$, $Z_4$, and $Z_5$, each temperature distribution pattern has five portions indicating the temperatures of the corresponding zones, such as five portions $P_{11}$, $P_{21}$, $P_{31}$, $P_{41}$, and $P_{51}$ for the temperature distribution pattern $P_1$, and five portions $P_{12}$, $P_{22}$, $P_{32}$, $P_{42}$, and $P_{52}$ for the temperature distribution pattern $P_2$ as shown in FIG. 7.

A work detector 7 disposed in front of the inlet of the furnace 1 detects each work 6 moving toward the furnace 1 and generates one work signal 8 for each work 6. The work signal 8 is sent to the temperature control apparatus 15 in synchronism with the movement of the works 6 toward the furnace 1.

A counting means 45 counts the work signals 8. When the count of the counting means 45 for a certain furnace temperature distribution pattern, e.g., $P_1$, coincides with the prescribed number $U_s$ of the works 6 to be heat-treated at the furnace temperature distribution pattern $P_1$, which number is stored in the memory 20, a setting means 60 resets the count of the counting means 45 to zero and reads out the outside temperature settings $x_{i2}$ for the next succeeding furnace temperature distribution pattern, e.g., $P_{i2}$, from the memory 20 to the temperature setting element 40 zone by zone in synchronism with the advancement of the works 6 in the furnace 1.

The temperature control apparatus 15 includes a control means 50 for individually regulating the heating element 2 of each of the zones $Z_1$ through $Z_n$ depending on the deviation of the temperature, detected by the heating-portion thermometer 4 of each zone, from the outside temperature setting $x_{is}$ carried by the temperature setting element 40 for that zone. The outside temperature settings $x_{is}$ are read out from the memory 20 onto the temperature setting element 40 zone by zone as explained above.

Preferably, optimal control parameters for each kind work 6 are stored in the memory 20 zone by zone. The control parameters are, for instance, proportional gain, derivative action time constant, and integral action time constant for proportional plus integral plus derivative (P.I.D.) control action, but the control parameters are not limited to such gains and time constants. When the counting means 45 counts up the prescribed number $U_s$ of the works 6 to be heat-treated, the setting means 60 preferably reads the control parameters for the next kind of words 6 from the memory 20 and places them on the regulating means 50 by the setting means 60.

For a furnace having a long time constant of temperature change, a suitable number of dummy bodies 14 (FIG. 7) may be inserted between the works 6 of kind A and the works 6 of kind B to the heat-treated at different temperatures. With the dummy bodies 14 thus inserted, the works 6 to be heat-treated at a newly changed temperature may be loaded in the furnace 1 only after feeding the dummy bodies 14 therein during the time interval necessary for the furnace to change its temperature. When the dummy bodies 14 are used, the temperature control apparatus 15 may include a selective driving means 70 for selectively driving either a work line 11 or a dummy line 12 (FIG. 7).

Essential functions of the temperature control apparatus of the invention will be explained now by referring to FIG. 5 and FIG. 6. For simplicity, only three series of the outside temperature settings $x_{ir}$ are considered in the flow chart of FIG. 6, i.e., r=3, so as to determine the heat transfer gains g by using the equations (8) to (10). However, the invention is not restricted to the equations (8) to (10) and the number of series of the outside temperature settings $x_{ir}$ can be increased to any suitable number, i.e., r=n, so as to to determine the transfer gains g by the generalized equation (3).

In the first step 301 of the operation, a count r is set at 1, so that a first series of the outside temperature settings $x_{i1}$ are read out from the memory 20 and set on the temperature setting element 40 in the next step 302. The furnace 1 is run under the control of the temperature control apparatus 15 and the inside temperatures $y_{i1}$ at the individual zones $Z_1$ through $Z_n$ are measured in step 303. Logical step 304 checks whether the inside temperatures are stabilized or not. If the inside temperatures are not stable, the control and the measurement of the step 303 are repeated until they are stabilized. The stabilized inside temperatures $y_{i1}$ are stored in the memory 20 in step 305.

As long as the count r is found to be not larger than 3 in the logical step 306, the count r is increased by 1 in step 307, for instance from 1 to 2 or from 2 to 3, and the next following series of the outside temperature settings, such as $x_{i2}$ or $x_{i3}$, are placed on the temperature setting element 40 in step 308. By repeating the above control of the furnace and the measuring and storing of the inside temperatures for the three series of outside temperature settings $x_{ir}$, three series of inside temperatures $y_{ir}$ corresponding to the above three series of the outside temperature settings are obtained.

The count r is reset to zero in step 309. The heat transfer gains $g_{ir}$ are determined by using the equations (8) to (10) in step 310. A desired temperature distribution pattern $P_{is}$ is expressed in the form of inside temperatures $y_i'$ and applied to the calculating means 80 in step 311. Step 312 is to calculate the outside temperature settings $x_{is}$ which are supposed to produce the inside temperatures $y_i'$ by using the equation (11). The above calculated outside temperature settings $x_{is}$ correspond to those of the matrix $x_i'$ of the equation (11). In the example of FIG. 6, the calculated outside temperature settings $x_{is}$ thus determined are stored in the memory 20 and set on the temperature setting element 40 in step 313.

Steps 314 and 315 are for running the furnace 1 under the control of the temperature control apparatus 15 until its inside temperatures are stabilized. More particularly, the temperature control apparatus 15 generates control signals 5 which control the heating elements 2 so as to minimize the difference between the actual outside temperatures as detected by the heating-portion thermometers 4 and the settings on the temperature setting element 40. The inside temperatures are measured by the intra-furnace thermometer 31 to check whether they are stabilized or not.

After its stability is confirmed in the step 315, the stabilized inside temperatures $y_i$ thus measured are stored in the memory 20 in step 316. Deviations $\Delta y_i$ of the stabilized inside temperatures from those of the desired temperature distribution pattern are detected by a temperature comparing means 46 in step 317. When the logical step 318 finds that any of the deviations $\Delta y_i$ is larger than a certain limit K, outside temperature corrections $\Delta x_i$ are determined by using the equation (11) in step 319, which corrections $\Delta x_i$ are algebraically added to the settings on the temperature setting elements 40 in step 320. Such corrections of the settings followed by the control and the measurement of the step 314 are repeated until the above deviation $\Delta y_i$ becomes smaller than the certain value K. With the present invention, the magnitude of the above corrections $\Delta x_i$ are calculated by using the heat transfer gains and the equation (11), so that the inside temperatures of the furnace 1 quickly converge.

In the example of FIG. 6, when the calculated outside temperature settings for a given temperature distribution pattern are determined, they are stored in the memory 20 in step 321, and similar calculations are repeated to produce the calculated outside temperature settings for other temperature distribution patterns.

When the calculated outside temperature settings for all the temperature distribution patterns to be used are determined, step 322 causes the control to proceed to the heat treatment of the works 6.

In actual furnaces, when the temperature settings are changed, a certain time delay is necessary before the inside temperature of the furnace reaches the newly set level and the control gets stabilized. Since it is not desirable to treat the works 6 in the furnace during such time delay, dummy bodies 14 may be loaded in the furnace 1 during the transient period of its temperature as shown in FIG. 7b. In the example of the figure, after a preceding lot of kind A works 6 pass through a certain zone of the furnace, dummy bodies 14 move through that zone until the time when the zone temperature reaches a suitable value for the kind B works 6 of the next succeeding lot. As soon as the above-mentioned suitable value of the zone temperature is reached, the kind B works 6 are loaded into that zone.

To effect such control including the use of the dummy bodies, in step 323 of FIG. 6, a series of the calculated outside temperature settings $x_{is}$ for the temperature distribution pattern suitable for works 6 of a specific kind S, which have been determined in the preceding steps, are read from the memory 20 onto the temperature setting element 40, and the prescribed quantity $U_s$ of the works 6 of the kind S to be treated is also read from the memory to the work setting element 41. The work kind S may be identified by the prescribed quantity $U_s$ as described above. At this moment, count $V_c$ in the counting means 45 for counting the work signals 8 is reset at zero, $V_c \equiv 0$.

Step 324 indicates that the count $V_c$ increases by one each time a work signal 8 is delivered from the work detector 7. In the illustrated example, the kind S of the work 6 is checked at step 325. If a dummy body 14 is to be loaded, the dummy line portion D of a selective drive means 70 is actuated. In the next step 326, it is checked whether the above count $V_c$ is smaller than the prescribed quantity $U_s$ carried by the work setting element 41.

If the prescribed quantity $U_s$ of the works 6 have not been loaded, the work line portion W of the selective drive means 70 is actuated, and at the same time, change in the kind S of the work 6 is checked zone by zone in step 327. If no change of the work kind S is found in any of the zones $Z_1$ through $Z_n$, the same control and measurement as those of the above step 303 are effected in step 328.

The control in response to a change in the work kind S will be described by referring to FIG. 5, FIG. 6 and FIGS. 7a, 7b. In the graph FIG. 7a, it is assumed that the temperature distribution pattern $P_1$ is for treating the kind A works 6 and the temperature distribution pattern $P_2$ is for treating the kind B works 6. When the heat treatment of the works 6 in the furnace 1 begins, the work detector 7 sends a work signal 8 to the bus 25 of the temperature control apparatus 15 each time one work 6 moves toward the furnace 1. The counting means 45 counts the work signals 8.

During the heat treatment at a certain temperature distribution pattern, if the above-mentioned control steps 326 and 327 find that the count $V_c$ of work signals 8 at the counting means 45 is less than the prescribed quantity $U_s$ of the works 6 for treatment at that certain temperature distribution pattern, which number is stored in the memory 20, and if there is no change in the work kind S at any of the zones $Z_1$ through $Z_5$ as the works 6 proceed in the furnace 1, then the setting means 60 does not actuate and the selective drive means 70 does not switch over, and the regulating means 50 operates while comparing the actual temperatures detected by the heating-portion thermometers 4 against the prevailing outside temperature settings in the temperature setting elements 40.

On the other hand, during the heat treatment with a certain temperature distribution pattern, if the control steps 326 and 330 find that the count $V_c$ of work signals 8 at the counting means 45 coincides with the prescribed quantity $U_s$ carried by the work setting element 41 and that there are succeeding works 6 to be heat-treated, the setting means 60 reads out a series of the calculated outside temperature settings $x_{i(s+1)}$ for the next succeeding temperature distribution pattern $P_{s+1}$ from the memory 20 onto the temperature setting element 40, as shown in the control step 323 of FIG. 6. At the same time, the prescribed quantity $U_s$ of the next kind of works 6 to be treated is placed on the work setting element 41 and the count $V_c$ of the counting means 45 is reset.

For example, referring to FIG. 6 and FIG. 7, if the counting means 45 counts up the prescribed quantity of the dummy bodies 14 and the work detector 7 detects the leading one of the kind B works 6, then the calculated outside temperature setting $x_{12}$ for that portion $P_{12}$ of the temperature distribution pattern $P_2$ for the kind B works 6 which corresponds to the zone $Z_1$ is read out from the memory 20 onto the temperature setting element 40 in the step 329. With the new settings on the temperature setting element 40, the regulating means 50 operates in the above-mentioned manner.

The operation in the case that the step 326 finds the prescribed quantity $U_s$ has not been treated yet while the step 327 finds a change in work kind S at a certain zone will be explained now. The time when the leading one of the kind B works 6 of FIG. 7b reaches any zone $Z_i$ can be determined indirectly by measuring the time interval from the moment of detecting the leading kind B work 6 by the work detector 7 until the time when the counting means 45 counts a certain number, for instance m, of the kind B works 6 passing under the work detector 7. The number m depends on the size of the kind B works 6, the length of each zone $Z_1$ through $Z_n$, the position of the specific zone $Z_i$ in the furnace 1, and the distance from the work detector 7 to the first zone $Z_1$.

When, for instance, it is only the zone $Z_2$ where the incoming work and the outgoing work are different from each other, that is, the kind B work 6 enters while a dummy body 14 leaves at a certain moment, the calculated outside temperature setting $x_{22}$, corresponding to that portion $P_{22}$ of the temperature distribution pattern $P_2$ for the kind B work 6 which is for the zone $Z_2$, is read out from the memory 20 onto the temperature setting element 40 in the control step 329. Thus, calculated temperature settings corresponding to a temperature distribution pattern as shown in the first two zone portions of the curve of FIG. 7b are placed on the temperature setting element 40 as the settings thereof. The regulating means 50 controls the heating elements 2 while using such settings of the temperature setting element 40.

In short, as a row of the works 6 and/or dummy bodies 14 move by one step on the treating line 30 of FIG. 5, the work detector 7 detects one work 6 or dummy body 14 which follows the previously detected work 6 or dummy body 14. Thus, one cycle of control action of the temperature control apparatus 15 is completed. Then, similar actions to the above are repeated each time a work signal 8 is applied to the bus 25 of the temperature control apparatus 15.

When the heat treatment of a prescribed quantity $U_s$ of the works 6 of kind S is completed, step 330 checks whether or not there are succeeding works 6 to be treated. If there are succeeding works 6, the control is transferred back to the step 323. If all the works 6 have been treated and there are no succeeding works 6, the control will come to the end.

If the optimal control parameters for each zone for each work kind are stored in the memory 20 together with the temperature distribution patterns, such optimal control parameters are read out from the memory 20 onto the regulating means 50 zone by zone as the temperature distribution pattern of the corresponding zones are read out. Thus, the furnace temperature is controlled with the optimal control parameters.

If information concerning the quantities and the sequence of different kinds of works 6 and the dummy bodies 14 in terms of a series of numbers representing quantities of the aligned works and the dummy bodies is stored in the memory 20, and if the works 6 and the dummy bodies 14 are aligned in strict agreement with the above series of the numbers stored in the memory, then it is possible to dispense with the selective driving means 70.

In the case that a selective means 70 is provided, a further modification is possible. Namely, a temperature comparing means 46 (FIG. 5) may be provided in the temperature control apparatus 15. Starting from the moment when the outside temperature setting for a given inside temperature distribution pattern $P_s$ is read out by the setting means 60, the temperature comparing means 46 determines the temperature difference $\Delta t$ between the actual inside temperature $y_1$ of the inlet end zone $Z_1$ of the furnace 1 and that portion $P_{1s}$ of the above temperature distribution pattern $P_s$ which corresponds to the zone $Z_1$. Then, the selective driving means 70 may forward the dummy bodies 14 into the furnace 1 until the above temperature difference $\Delta t$ becomes less than a certain allowable limit.

When the range of variation of different temperature distribution patterns P to be used is so narrow that the heat transfer gains g do not vary over a wide range, only the outside temperature settings for one typical temperature distribution pattern P may be stored in the memory 20. If a non-typical temperature distribution pattern falling in the above range is desired, the outside temperature setting for such non-typical temperature distribution pattern may be determined by linear interpolation or extrapolation. The temperature control apparatus 15 may be operated after placing the thus determined outside temperature settings on the temperature setting element 40.

To improve the control speed, instead of the one movable intra-furnace thermometer 31 described above, a plurality of static intra-furnace thermometers 31 may be used, for instance one such static thermometer 31 per zone. With such static intra-furnace thermometers 31, the inside temperature distribution pattern of the furnace 1 can be measured by switching the outputs from them, whereby the time necessary for the movable intra-furnace thermometer to travel through the furnace 1 can be saved.

The invention will be described in further detail be referring to examples.

EXAMPLES

Figure 2:
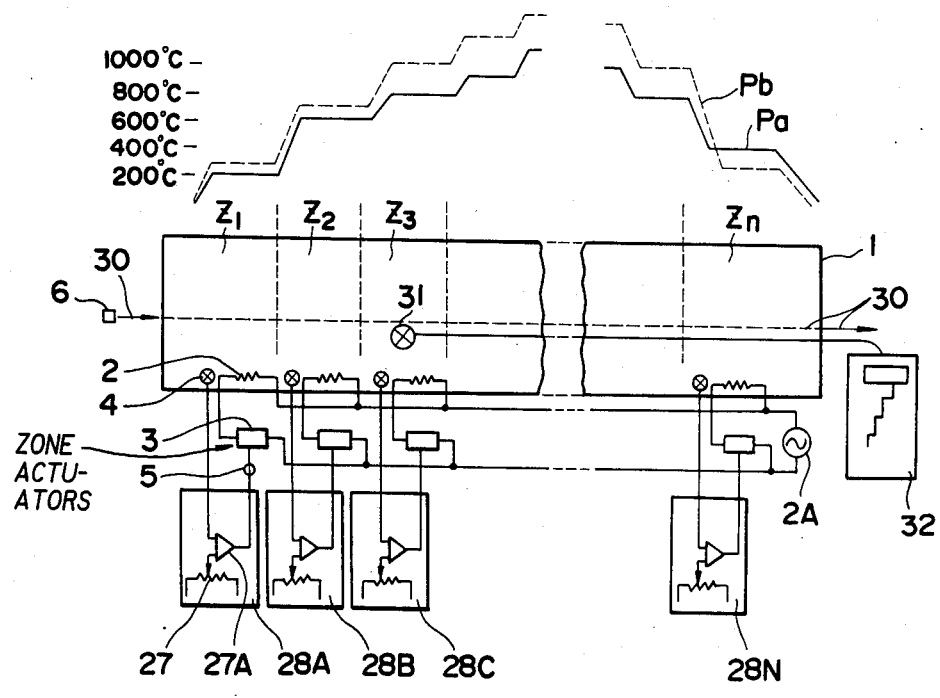
FIG. 2 is a schematic diagram of a conventional temperature control apparatus for a furnace.
Figure 9:
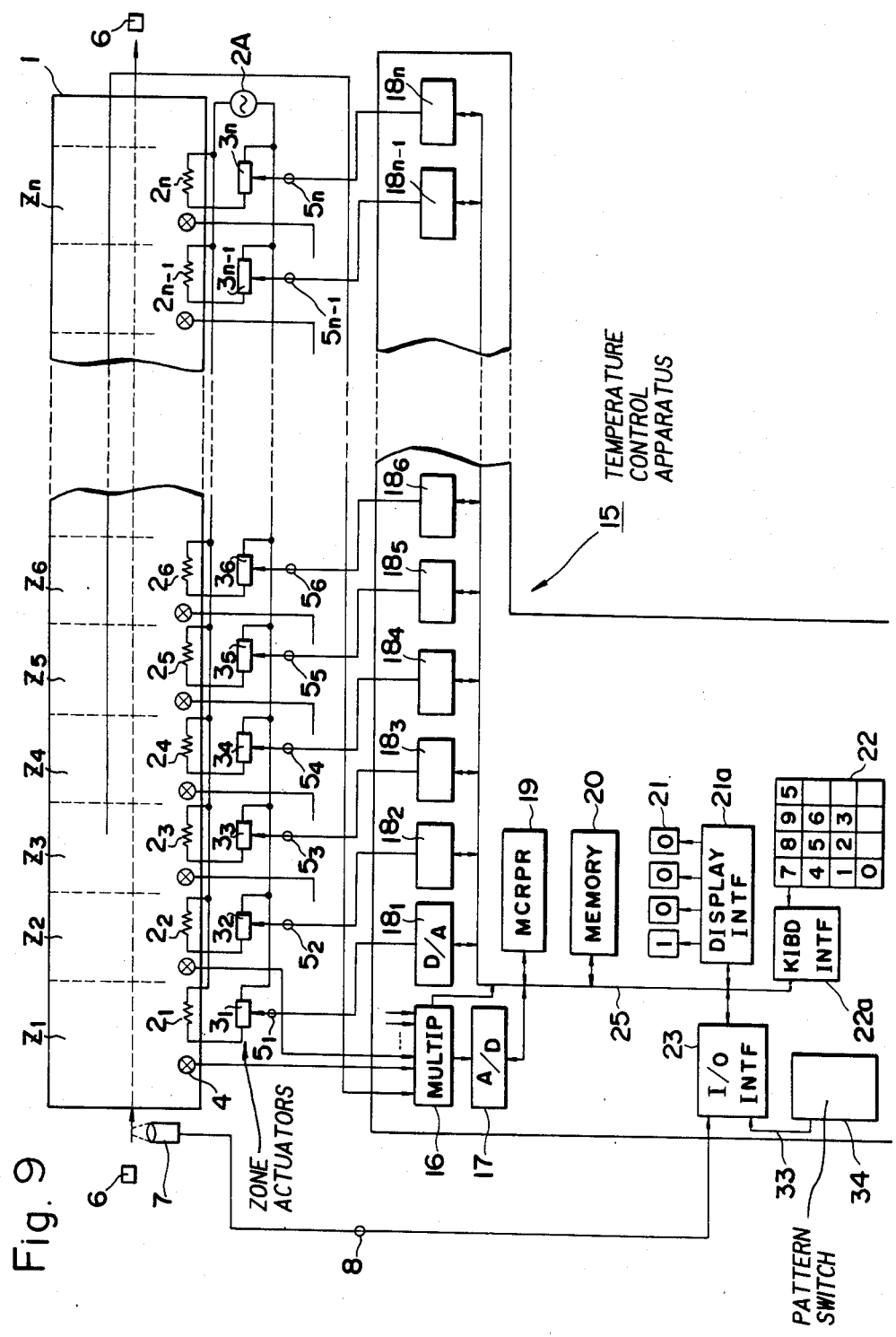
FIG. 9 is a block diagram of essential portions of an embodiment of the invention.

FIG. 9 shows a detailed block diagram of essential portions of a practical example of the temperature control apparatus 15 of the invention. In the figure, parts similar to those of FIG. 1 and FIG. 2 are designated by similar numerals and symbols. A multiplexer 16 serially supplies temperature signals from the intra-furnace thermometer 31 and the heating-portion thermometers 4 of the zones $Z_1$ through $Z_n$ to a bus 25 through an analog-to-digital (A/D) converter 17. Digital-to-analog (D/A) converters $18_1$ through $18_n$ convert digital control signals $5_1$ through $5_n$ on the bus 25 into analog signals and apply them to the actuating means $3_1$ through $3_n$.

The bus 25 has a microprocessor (MCRPR) 19, the memory 20, and a display interface 21a connected thereto so as to execute the operation of the temperature control apparatus 15 and to actuate a display 21. Further, a keyboard 22, which is used for manual loading to the memory 20 and other purposes, is also connected to the bus 25 through a keyboard interface 22a. The work signals 8 from the work detector 7 for counting the works 6 are applied to the bus 25 through an input/output interface 23, while signals from a pattern switch 34 for switching the temperature distribution patterns are delivered to a signal line 33 and then applied to the bus 25 through the input/output interface 23. The pattern switch 34 has, for instance, a plurality of switch positions each of which corresponds to one temperature distribution pattern.

The operation of the temperature control apparatus 15 of FIG. 9 will be explained now. The input signals from the heating-portion thermometers 4 at different zones $Z_1$ through $Z_n$ of the furnace 1 are sampled at suitable time intervals while switching them by the multiplexer 16, and such input signals are converted into digital signals by the A/D converter 17 and applied to the bus 25 for storage in the memory 20 as the outside temperatures x. Signals representing the measured inside temperatures from the intra-furnace thermometer 31 are similarly sampled by the multiplexer 16, converted by the A/D converter 17, and stored in the memory 20 through the bus 25 as the inside temperature y. Signals representing the temperature distribution patterns $P_{is}$ are applied to the bus 25 either from the pattern switch 34 through the signal line 33 and the input/output interface 23 or from the keyboard 22 through the keyboard interface 22a, and then such signals are stored in the memory 20.

A number of series of the outside temperature settings $x_{ir}$ for determining the heat transfer gains $g_{ir}$ are applied to the memory 20 either from the keyboard 22 or from the pattern switch 34 in a manner similar to that of the temperature distribution pattern $P_{is}$ signals.

Referring to the step 302 of FIG. 6, the microprocessor MCRPR 19 sets such outside temperature settings $x_{ir}$, one series of them at a time, on the temperature setting element 40 which is defined in the memory 20 in this example. The microprocessor MCRPR 19 compares the signals from the heating-portion thermometers 4 against the outside temperature settings $x_{ir}$, and mathematically processes the difference therebetween so as to generate control signals $5_1$ through $5_n$. The control signals $5_1$ through $5_n$ are applied to the actuating means $3_1$ through $3_n$ via D/A converters $18_1$ through $18_n$, so as to control the heat generation by the heating elements $2_1$ through $2_n$.

After the furnace temperature is stabilized, the microprocessor MCRPR 19 carries out the determination of the heat transfer gains $g_{ir}$, the calculation and setting of the calculated outside temperature settings $x_{is}$, and the control of the heat treatment of the works 6 in the manner described in the foregoing paragraphs.

In the embodiment of FIG. 9, the keyboard 22 or the pattern switch 34 fulfills a part of the function of the setting means 60 of FIG. 5, and the microprocesor MCRPR 19 fulfills the functions of the counting means 45, the temperature comparing means 46, the regulating means 50, the selective driving means 70, the calculating means 80 and the remaining function of the setting means 60.

The display 21 is used for monitoring various signals, such as the temperature distribution pattern signals during their loading from the keyboard 22.

The example of FIG. 9 uses the so-called multi-loop control system which controls a plurality of loops by a single control apparatus. Recently, controllers of distributed type, such as the so-called single-loop or one-loop type, have been used increasingly. FIG. 10 shows an example of the temperature control apparatus of the invention using distributed controllers. Zones $Z_1$ through $Z_n$ of the furnace 1 of this example are controlled by individual single-loop controllers $101_1$ through $101_n$ respectively, which controllers are connected to a common computer 103 through transmission lines 102. In this example, the work signal 8 from the work detector 7 and the signals from the pattern switch 34 are directly interfaced to the computer 103. However, if the controllers $101_1$ through $101_n$ are provided with digital interfaces capable of receiving the work signals 8 and the pattern switch signals, such signals may be interfaced to one of the controllers.

The intra-furnace thermometer 31 is connected to a temperature distribution measuring unit 105 through a signal line 104, which unit is connected to the computer 103 through the transmission line 102.

In the formation of FIG. 10, the computer 103 executes the determination of the heat transfer gains g while using the inside temperatures y measured by the intra-furnace thermometer 31, the determination of the calculated outside temperature settings $x_{is}$ for producing a desired temperature distribution pattern $P_{is}$, and other calculations. The memory 20 of the computer 103 has a considerably larger capacity than that of regular controller, so that the embodiment of FIG. 10 has an advantage of storing a large number of temperature distribution patterns, kinds and quantities of the works 6, and the like.

Each single-loop controller $101_1$ through $101_n$ receives various constants, such as temperature settings and control parameters, from the computer 103 through the transmission line 102 so as to carry out proper control action based on the thus received constants, and each controller transmits measured data to the computer 103. When the temperature distribution pattern is switched, all or a part of the individual controllers $101_1$ through $101_n$ serially receive the calculated outside temperature settings and control parameters for the newly switched temperature distribution pattern from the computer 103. Thereafter, the control is performed with the newly received data, so that the same temperature control as that of the example of FIG. 9 can be effected.

As described in the foregoing, a pattern-switching temperature control apparatus according to the invention automatically switches the temperature distribution pattern while dealing with the inter-zone interferences of a multi-zone furnace, by determining settings of heating-portion temperature or outside temperature for a desired temperature distribution pattern while taking the inter-zone interference into consideration and by changing the intra-furnace temperature distribution pattern zone by zone in synchronism with change in the kind of works moving in the furnace, so that the following effects are achieved:

(a) Speedup and automation can be simultaneously achieved in switching the intra-furnace temperature distribution pattern.

(b) The switching of the intra-furnace temperature distribution pattern can be effected with accurate timing, and such pattern after the switching can be maintained accurately.

(c) In production of a large variety of goods in small quantities through heat treatments at different temperatures, works can be loaded into the furnace immediately after the desired temperature is reached by using the automatic loading of dummy bodies and automatic switching from the dummy body to the work, whereby both the efficiency of the heat treatment and the furnace utility are improved.

(d) Cumbersome manual operations for switching the temperature settings for different temperature patterns are eliminated, whereby considerable savings are achieved in labor, time, and energy consumption.

(e) The temperature control apparatus eliminates time lag which is intrinsic to manual switching of temperature settings and facilitates proper modification of settings in time, so that precise temperature control system is made possible.

(f) The temperature control apparatus can be computerized so as to cope with a large amount of data such as temperature distribution patterns, and it is suitable to a large system having many temperature control points.

What is claimed is:

1. A pattern-switching temperature control apparatus dealing with inter-zone interference for a multi-zone furnace with an intra-furnace thermometer means, each zone having a heating portion carrying a heating element and a heating-portion thermometer, comprising a work setting element where a number representing a prescribed quantity of works of a kind to be heat-treated is set;

a temperature setting element on which a series of temperature settings ($x_i$) for individual heating portions of the furnace zones ($Z_i$) are set;

a memory adapted to store a plurality of temperature distribution patterns ($P_{is}$) for the furnace, a set of said numbers representing the prescribed quantities of works of different kinds to be heat-treated at corresponding ones of said temperature distribution patterns, a set of different series of temperature settings ($x_{ir}$) to be selectively set on said temperature setting element, and a set of inside temperatures ($y_{ir}$) detected by said intra-furnace thermometer means at different furnace zones when said temperature setting element carries corresponding ones of said settings ($x_{ir}$);

a calculating means for calculating a heat transfer gains ($g_{ir}$) from said set of temperature settings ($x_{ir}$) and said set of inside temperatures ($y_{ir}$), calculating series of temperature settings ($x_{is}$) for said temperature distribution patterns ($P_{is}$) by using the heat transfer gains ($g_{ir}$), and storing the thus calculated series of temperature settings in said memory;

a counting means for counting the number of those works of one kind which are heat-treated by the furnace;

a setting means adapted, when count of said counting means coincides with said prescribed quantity of said one kind of works, to read out that number from the memory onto said work setting means which represents the presecribed quantity of the works to be heat-treated next and to read out said calculated series of temperature settings for the temperature distribution pattern to be used next from said memory; and a regulating means adapted to control said heating element depending on difference between actual temperature detected by said heating-portion thermometer and temperature settings on said temperature setting element.

2. A pattern-switching temperature control apparatus as set forth in claim 1, wherein said calculating means determines said heat transfer gains ($g_{ir}$) from a set of heating portion temperatures detected by said heating-portion thermometer and a set of inside temperatures ($y_{ir}$) detected by said intra-furnace thermometer means for said series of temperature settings ($x_{ir}$).

3. A pattern-switching temperature control apparatus as set forth in claim 1 and further comprising a pattern switch adapted to select one of said temperature distribution patterns stored in said memory.

4. A pattern-switching temperature control apparatus as set forth in claim 1, wherein said regulating means is adapted to control said heating element of each zone depending on the difference between the temperature detected by heating-portion thermometer for said zone and said temperature setting carried by said temperature setting element for said zone.

5. A pattern-switching temperature control apparatus as set forth in claim 1, wherein said memory further stores control parameters for different kinds of works zone by zone, and said setting means being adapted, when reading said series of temperature settings, to read out said control parameters to said regulating means zone by zone, whereby said regulating means regulates said heating elements while using different control parameters for different kinds of works.

6. A pattern-switching temperature control apparatus as set forth in claim 1, wherein said numbers stored in said memory includes a number representing prescribed quantity of dummy bodies to be inserted between one kind of works and next kind of works.

7. A pattern-switching temperature control apparatus as set forth in claim 6, wherein said apparatus further comprises a selective driving means adapted to selectively forward either works or dummy bodies to the furnace until said counting means counts up said prescribed quantity of works or dummy bodies.

8. A pattern-switching temperature control apparatus as set forth in claim 7, wherein said apparatus further comprises a temperature comparing means adapted to determine, when one of said temperature distribution patterns is selected, a temperature difference between furnace inlet end temperature of the thus selected temperature distribution pattern and actual temperature of furnace inlet end zone detected by the intra-furnace thermometer means, and said selective driving means being adapted to forward dummy bodies to the furnace as long as the temperature difference thus determined by the temperature comparing means is larger than a certain predetermined value.

9. A pattern-switching temperature control apparatus as set forth in claim 4, wherein said regulating means is a multi-loop regulator adapted to generate control signals to the heating elements at different zones of said furnace.

10. A pattern-switching temperature control apparatus as set forth in claim 5, wherein said regulating means is a multi-loop regulator adapted to generate control signals to the heating elements at different zones of said furnace.

11. A pattern-switching temperature control apparatus as set forth in claim 4, wherein said regulating means consists of a plurality of controllers associated with the furnace zones respectively, each controller having a temperature setting element adapted to carry a corresponding furnace zone portion of each temperature distribution pattern and a control parameter element adapted to carry control parameters for the corresponding furnace zone, a computer having said memory and a means to transmit said temperature distribution patterns and said control parameters, and a transmission line extending between the computer and said controllers.

12. A pattern-switching temperature control apparatus as set forth in claim 5, wherein said regulating means consists of a plurality of controllers associated with the furnace zones respectively, each controller having a temperature setting element adapted to carry a corresponding furnace zone portion of each temperature distribution pattern and a control parameter element adapted to carry control parameters for the corresponding furnace zone, a computer having said memory and a means to transmit said temperature distribution patterns and said control parameters, and a transmission line extending between the computer and said controllers.

* * * * *